United States Patent
Mori et al.

(10) Patent No.: US 7,834,748 B2
(45) Date of Patent: Nov. 16, 2010

(54) APPARATUS FOR DETECTING VEHICLE WHEEL POSITIONS USING TRIGGERING SIGNAL FROM TRIGGERING DEVICE AND CARRIED OUT WITH RATIO OF DISTANCES BETWEEN WHEEL MOUNTED TRANSCEIVERS AND TRIGGERING DEVICE

(75) Inventors: Masashi Mori, Oobu (JP); Nobuya Watabe, Nagoya (JP)

(73) Assignee: Denso Corporation, Kariya (JP)

( * ) Notice: Subject to any disclaimer, the term of this patent is extended or adjusted under 35 U.S.C. 154(b) by 466 days.

(21) Appl. No.: 11/957,025

(22) Filed: Dec. 14, 2007

(65) Prior Publication Data

US 2008/0150710 A1 Jun. 26, 2008

(30) Foreign Application Priority Data

Dec. 15, 2006 (JP) ............................. 2006-338545

(51) Int. Cl.
   *B60C 23/00* (2006.01)
(52) U.S. Cl. .................... 340/447; 340/442; 73/146.5
(58) Field of Classification Search ................. 340/442, 340/445, 447, 539.1; 73/146, 146.2, 146.4, 73/146.5
See application file for complete search history.

(56) References Cited

U.S. PATENT DOCUMENTS

| 5,602,524 | A  | 2/1997 | Mock et al. |
| 6,879,252 | B2 | 4/2005 | DeZorzi et al. |
| 6,888,446 | B2 | 5/2005 | Nantz et al. |
| 2005/0253696 | A1 | 11/2005 | Mori et al. |
| 2006/0006992 | A1 | 1/2006 | Daiss et al. |
| 2007/0008097 | A1 | 1/2007 | Mori et al. |

FOREIGN PATENT DOCUMENTS

| JP | H07-507513 | 8/1995 |
| JP | 2005-350046 | 12/2005 |
| JP | 2007-015491 | 1/2007 |

OTHER PUBLICATIONS

U.S. Appl. No. 11/964,259, filed Dec. 2007, Mori et al.
U.S. Appl. No. 11/963,238, filed Dec. 2007, Mori et al.

*Primary Examiner*—Jeffery Hofsass
(74) *Attorney, Agent, or Firm*—Nixon & Vanderhye PC (57) ABSTRACT

An apparatus detects positions of the right/left and front/rear four wheels of a vehicle. The detection is performed using transceivers attached to the respective wheels, a triggering device disposed in a body of the vehicle to output the triggering signal, and a receiver disposed on the body. The triggering device includes a first triggering device located closer to the two front wheels than the two rear wheels and located at a position where distances from the right-front wheel and the left-front wheel are mutually different, and a second triggering device located closer to the two rear wheels than the two front wheels and located at a position where distances from the right-rear wheel and the left-rear wheel are mutually different. Distances between each triggering device and each of the two transceivers receiving the triggering signal from the triggering device are decided at a given ratio in consideration of reception sensitivity.

11 Claims, 6 Drawing Sheets

APPARATUS FOR DETECTING VEHICLE WHEEL POSITIONS USING TRIGGERING SIGNAL FROM TRIGGERING DEVICE AND CARRIED OUT WITH RATIO OF DISTANCES BETWEEN WHEEL MOUNTED TRANSCEIVERS AND TRIGGERING DEVICE

CROSS REFERENCES TO RELATED APPLICATION

The present application relates to and incorporates by reference Japanese Patent application No. 2006-338545 filed on Dec. 15, 2006.

BACKGROUND OF THE INVENTION

1. Field of the Invention

The present invention relates to an apparatus for detecting the wheel positions of a vehicle, on which respective wheels are installed, and an apparatus for detecting the inflation pressure of the tires of a vehicle, such as a direct-type tire inflation pressure detection apparatus.

2. Description of the Related Art

A direct-type apparatus for detecting the inflation pressure of tires of a vehicle is known. This tire inflation pressure detecting apparatus is provided with a transceiver equipped with a sensor such as a pressure sensor, which is directly installed on each wheel with a tire. An antenna and a receiver are provided in the vehicle body. Thus, when the receiver receives, via the antenna, from the transmitter a detection signal detected by the sensor, the receiver is able to detect the inflation pressure of each tire based on the received detection signal.

In this direct-type tire inflation pressure detecting apparatus, it is determined whether or not data which has been received is coming from the transceiver of the own vehicle and it is determined on which of the wheels a transmitter/transmitter in question is installed. For these determinations, as shown in U.S. Pat. No. 5,602,524 (which corresponds to Japanese Patent No. 3212311), data to be transmitted from each transceiver additionally contains ID (identification) information to distinguish the own vehicle from other vehicles and identify each wheel with the transceiver. The ID information is previously stored in the receiver and, when the receiver receives data from the transceiver, the stored ID information and the received ID information are used to determine the wheel the data is coming from.

However, the foregoing conventional detecting apparatus is confronted with a difficulty. Specifically, the determination of the respective wheels equipped with the respective transceivers requires that inherent ID information be contained in data transmitted from each transceiver. Hence, if the ID information is not used, it is impossible to distinguish data coming from each transceiver from data coming from other transceivers. That is, the positions of the respective wheels cannot be detected without using the ID information.

The foregoing conventional detecting apparatus is confronted with another difficulty. Specifically, when a user changes the positions of the tires by rotation, for example, the user has to read the ID information of the rotated tires and renew the ID information that has been registered up to then. Without doing this, the tire inflation pressure detecting apparatus cannot cope with the position change of the wheels.

Therefore, it is desired that a tire inflation pressure detecting apparatus can detect the wheels equipped with the respective transceivers without using the ID information (wheel-position information). In other words, it is desired that a tire inflation pressure detecting apparatus can detect the positions at which the respective transceivers are attached. Alternatively, where it is necessary to renew the ID information because of the position change of the wheels, the renewal of the ID data is desired to be automatically performed.

SUMMARY OF THE INVENTION

The present invention has been made in light of the circumstances described above, and has as its object to provide a wheel position detecting apparatus, which is able to detect a wheel to which each transceiver is attached without the need of performing readout of the ID information by the user, and which is able to prevent a triggering signal from being received by a transceiver installed on a wheel which is not subjected to detection.

In order to achieve the above object, a triggering device in a mode of the present invention includes: a first triggering device disposed closer to the side of two front wheels than to two rear wheels so as to have different distances therefrom to a right-front wheel and to a left-front wheel, which constitute the two front wheels; and a second triggering device disposed closer to the side of the two rear wheels than to the two front wheels so as to have different distances therefrom to a right-rear wheel and to a left-rear wheel, which constitute the two rear wheels. In this arrangement of the present invention, a ratio $L1/L2 \geqq 1.2$ can be established, where L1 represents a distance between the first triggering device and a transceiver of one of the two rear wheels closer to the first triggering device in a state where the transceiver is located closest to the first triggering device, and L2 represents a distance between the first triggering device and a transceiver of one of the two front wheels further from the first triggering device in a state where the transceiver is located furthest from the first triggering device. Similarly, a ratio $L3/L4 \geqq 1.2$ can be established, where L3 represents a distance between the second triggering device and a transceiver of one of the two front wheels closer to the second triggering device in a state where the transceiver is located closest to the second triggering device, and L4 represents a distance between the second triggering device and a transceiver of one of the two rear wheels further from the second triggering device in a state where the transceiver is located furthest from the second triggering device.

Thus, the ratio of the distance L1 to the distance L2 (L1/L2) is ensured to be 1.2 or more. Also, the ratio of the distance L3 to the distance L4 (L3/L4) is ensured to be 1.2 or more. Accordingly, the triggering signals outputted from the first triggering device can be adapted to be received only by the transceivers installed on the two front wheels. Also, the triggering signals outputted from the second triggering device can be adapted to be received only by the transceivers installed on the two rear wheels. In this way, with the wheel position detecting apparatus of the present invention, it is possible to detect the correlation between the individual transceivers and the individual wheels without the need, for example, for the user to read out the ID information. In addition, the wheel position detecting apparatus is capable of preventing the triggering signals from being received by the transceivers which are not subjected to reception of the triggering signals, or which are installed on the wheels not subjected to detection. Thus, the wheel position detecting apparatus can prevent the wheel position detection from being less accurately performed.

In this case, the first triggering device can be disposed more frontward in the vehicle than the two front wheels, and the second triggering device can be disposed more rearward in the vehicle than the two rear wheels. Thus, the ratio of the distance L1 to the distance L2 (L1/L2) and the ratio of the distance L3 to the distance L4 (L3/L4) can be made larger. For example, the first triggering device may be disposed frontward of a tire house of one of the two front wheels closer to the first triggering device. Also, the second triggering device may be disposed rearward of a tire house of one of the two rear wheels further from the second triggering device.

Further, in this case, one of the two rear wheels, to which the second triggering device comes close, and one of the two front wheels, to which the first triggering device comes closes may have a diagonal positional relationship. Thus, such a mode of disposing one triggering device on both of left and right sides of the vehicle may balance the weight of the triggering devices and wire harnesses linked thereto, between the left and right of the vehicle. Thus, the weight of the vehicle can be well balanced between left and right.

Further, a triggering device in another mode of the present invention includes: a first triggering device disposed on the side of two left wheels rather than on the side of two right wheels so as to have different distances therefrom to a left-front wheel and to a left-rear wheel, which constitute the two left wheels; and a second triggering device disposed on the side of the two right wheels rather than on the side of the two left wheels so as to have different distances therefrom to a right-front wheel and to a right-rear wheel, which constitute the two right wheels. In this arrangement of the present invention, a ratio of L1/L2≧1.2 can be established, where L1 represents a distance between the first triggering device and a transceiver of one of the two right wheels closer to the first triggering device in a state where the transceiver is located closest to the first triggering device, and L2 represents a distance between the first triggering device and a transceiver of one of the two left wheels further from the first triggering device in a state where the transceiver is located furthest from the first triggering device. Also, a ratio of L3/L4≧1.2 can be established, where L3 represents a distance between the second triggering device and a transceiver of one of the two left wheels closer to the second triggering device in a state where the transceiver is located closest to the second triggering device, and L4 represents a distance between the second triggering device and a transceiver of one of the two right wheels further from the second triggering device in a state where the transceiver is located furthest from the second triggering device.

Thus, the ratio of the distance L1 to the distance L2 (L1/L2) is ensured to be 1.2 or more. Also, the ratio of the distance L3 to the distance L4 (L3/L4) is ensured to be 1.2 or more. Accordingly, the triggering signals outputted from the first triggering device can be adapted to be received only by the transceivers installed on the two left wheels. Also, the triggering signals outputted from the second triggering device can be adapted to be received only by the transceivers installed on the two right wheels. In this way, with the wheel position detecting apparatus of the present invention, it is possible to detect the correlation between the individual transceivers and the individual wheels without the need, for example, for the user to read out the ID information. In addition, the wheel position detecting apparatus is capable of preventing the triggering signals from being received by the transceivers which are not subjected to reception of the triggering signals, or which are installed on the wheels not subjected to detection. Thus, the wheel position detecting apparatus can prevent the wheel position detection from being less accurately performed.

In the description provided so far, the present invention has been exemplified as a wheel position detecting apparatus. However, the wheel position detecting apparatus may be incorporated into a tire inflation pressure detecting apparatus.

DETAILED DESCRIPTION OF THE PREFERRED EMBODIMENTS

With reference to the accompanying drawings, hereinafter will be described some embodiments of the present invention. Throughout the embodiments, the identical or similar components, if any, are given the same reference numerals or symbols for the sake of omitting explanation.

First Embodiment

Figure 1:
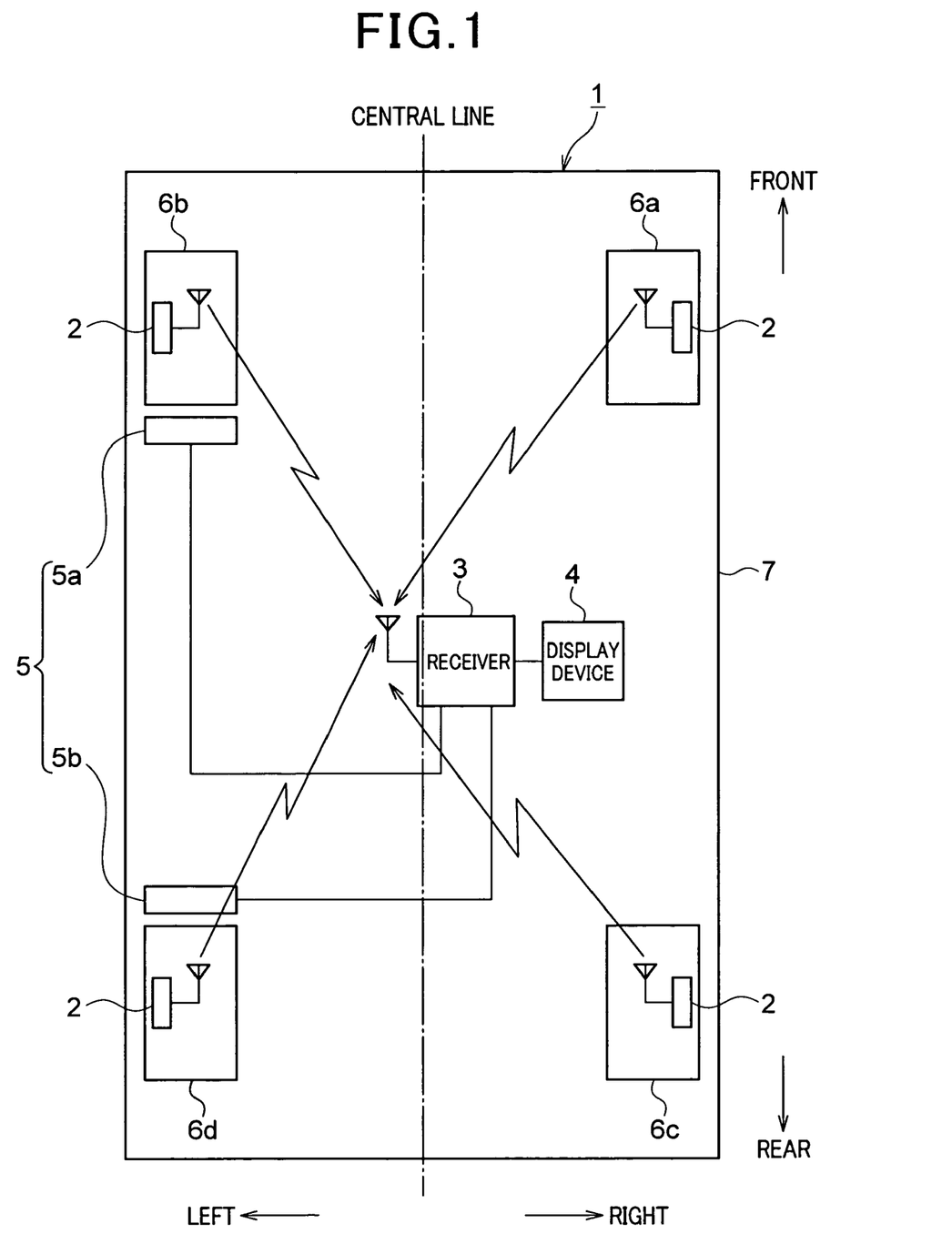
FIG. 1 is a block diagram generally illustrating a tire inflation pressure detecting apparatus, in which a wheel position detecting apparatus is applied, according to a first embodiment of the present invention.

A first embodiment of the present invention will be described referring to the drawings. FIG. 1 is a block diagram generally illustrating a tire inflation pressure detecting apparatus, in which a wheel position detecting apparatus is applied, according to a first embodiment of the present invention. A direction toward an upper portion of the drawing sheet of FIG. 1 corresponds to a frontward direction of a vehicle 1, and a direction toward a lower portion of the drawing sheet of FIG. 1 corresponds to a rearward direction of the vehicle 1. Referring to FIG. 1, a tire inflation pressure detecting apparatus according to the present invention will be described.

As shown in FIG. 1, the tire inflation pressure detecting apparatus, which is or is to be mounted on a vehicle 1, includes four transceivers 2, a receiver 3, a display device 4, and triggering devices 5. In the present embodiment, the transceivers 2, receiver 3, and triggering devices 5 compose the wheel position detecting apparatus according to the present invention.

Each of the transceivers 2 is mounted on one of the four wheels 6a-6d (or the five wheels including the spare tire), so as to have association with the tire on one of the wheels 6a-6d. Each transceiver 2 works to sense the inflation pressure of the associated tire and transmit a frame of data that contains tire pressure information indicative of the sensed inflation pressure of the associated tire.

On the other hand, the receiver 3 is mounted on the body 7 of the vehicle 1. The receiver 3 works to receive all the frames of data transmitted by the transceivers 2 and determine the inflation pressure of each of the four tires based on the tire pressure information contained in the received frames of data.

Figure 2:
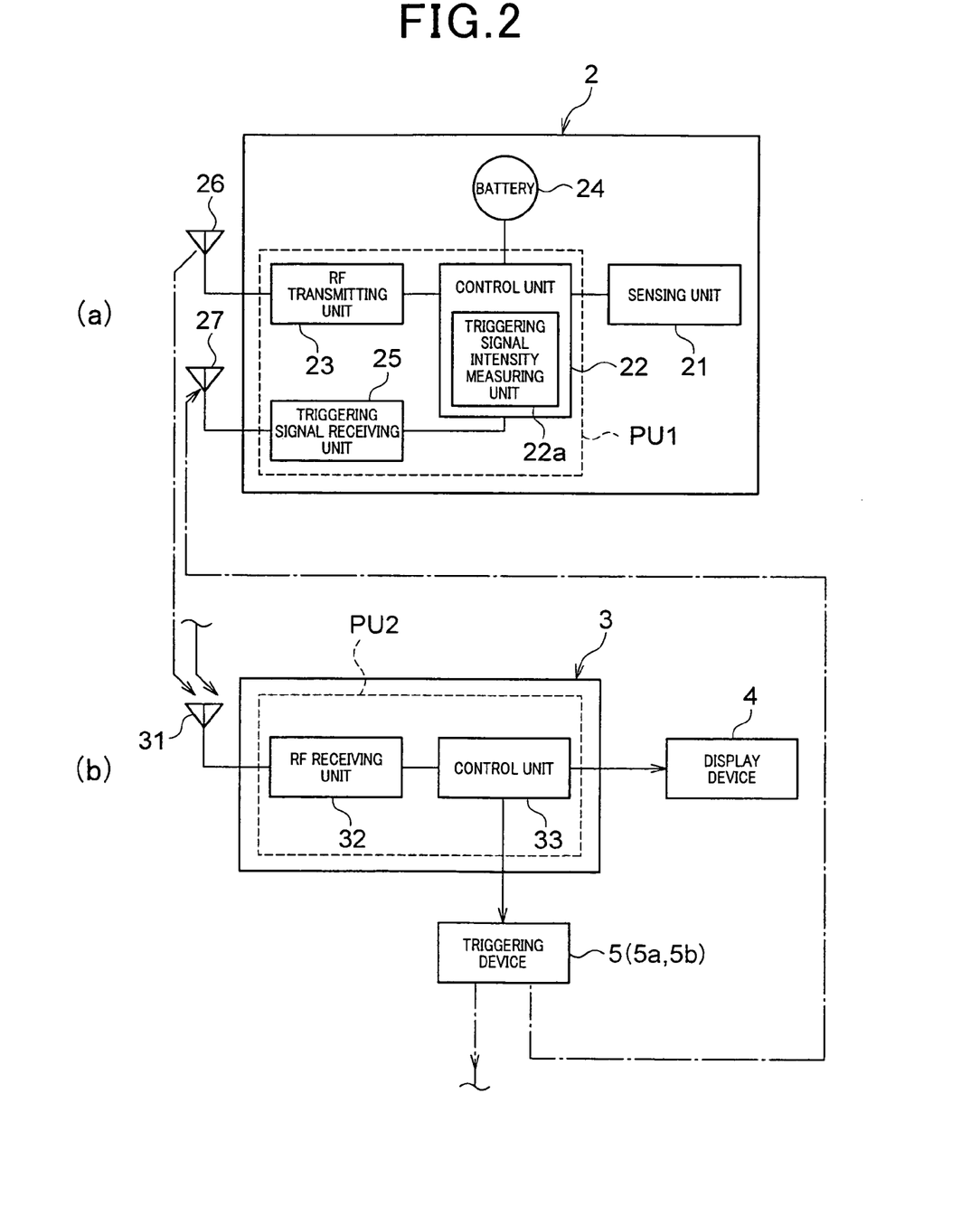
FIG. 2 is a block diagram illustrating a transceiver of the tire inflation pressure detecting apparatus illustrated in FIG. 1 and illustrating a receiver of the tire inflation pressure detecting apparatus illustrated in FIG. 1.

FIG. 2 shows in block forms the configurations of each of the transceivers 2 and the receiver 3, respectively. As shown in FIG. 2(a), each transceiver 2 is configured with a sensing unit 21, a control unit 22, an RF (radio-frequency) transmitting unit 23, a battery 24, a triggering signal receiving unit 25, a transmitting antenna 26 and a receiving antenna 27. Of these, the control unit 22, transmitting unit 23, and triggering signal receiving unit 25 compose a first processing unit PU1.

The sensing unit 21 is configured with sensors, such as a diaphragm-type pressure sensor and a temperature sensor, and works to output signals representative of the sensed inflation pressure of the tire and the sensed temperature of air in the tire.

The control unit (first control unit) 22 is made up of a known microcomputer having, for example, a CPU (Central Processing Unit), ROM (Read-Only Memory), RAM (Random Access Memory) and I/O (Input/Output) interfaces, and executes predetermined processes according to programs stored in the ROM, for example.

Specifically, the control unit 22 receives a detection signal associated with inflation pressure of the tire from the sensing unit 21. The received signal is then conditioned and, if necessary, processed by the control unit 22 and stored in a transmission frame in the form of data indicative of the results of detection (hereinafter referred to just as "inflation pressure data"), together with ID (identification) information of the transceiver 2. The frame is then transmitted to the RF transmitting unit 23. The processes for transmitting a signal to the RF transmitting unit 23 is periodically executed according to the programs mentioned above.

When an ignition switch is in an off-state, the control unit 22 is normally in a sleep mode. However, upon reception of a triggering signal, followed by the input of a startup command contained in the triggering signal, the control unit 22 is switched to a wake-up mode. The control unit 22 is provided with a triggering signal intensity measuring unit 22a. When the control unit 22 is switched to a wake-up mode by receiving a triggering signal from the triggering device 5 through the receiving antenna 27 and the triggering signal receiving unit 25, the triggering signal intensity measuring unit 22a measures reception intensity of the triggering signal. Then, the control unit 22 processes the reception intensity data as required, stores the processed reception intensity data in the frame that has stored the inflation pressure data, or in a different frame, and transmit the frame to the RF transmitting unit 23. These processes of measuring the reception intensity of the triggering signal and transmitting the reception intensity data to the RF transmitting unit 23 are also performed according to the programs mentioned above.

The control unit 22 also controls timing for transmitting the frame to the RF transmitting unit 23. This control is purposed to prevent butting between transmission data coming from the individual transceivers 2. For example, transmission timing, that is, how many seconds later the frame should be transmitted after receiving the triggering signal, is differently preset for every transceiver 2. Accordingly, each frame is ensured to be transmitted at different timing from each of the transceivers 2 of the wheels 6a-6d.

However, the memory contents will become different between the individual transceivers 2, or different programs have to be prepared between the individual transceivers 2, if merely the different transmission timing is stored in the control unit 2 of each of the transceivers 2 installed on the wheels 6a-6d for the purpose of ensuring transmission of the frames at different timing between the transceivers 2. In this regard, all the programs of the control units 22 can be made common between the transceivers 2 by offsetting the transmission timing between the frames according to the reception intensity. To this end, for example, a map may be prepared so that the transmission timing can be selected according to the reception intensity. Alternatively, a function formula may be stored in the control unit 22 to calculate the transmission timing using transmission intensity as a variable, so that the transmission timing is inevitably differentiated between the transceivers 2 by the different reception intensity.

Alternatively, the programs stored in the control unit 22 may be prepared in such a way that the transmission timing can be randomly changed at every occurrence. The random change of the transmission timing can ensure, with high probability, complete differentiation of the transmission timing between the transceivers 2.

The RF transmitting unit 23 transmits the frame transmitted from the control unit 22 to the receiver 3 through the transmitting antenna 26. The RF transmitting unit 23 functions as an output unit for transmitting the frame to the receiver 3 in RF band, or at 315 MHz, for example.

In this sense, the triggering signal receiving unit 25 functions as an input unit for receiving the triggering signal through the receiving antenna 27 and transmitting it to the control unit 22.

The battery 24 supplies power to the control unit 22, and the like. The power supply of the battery 24 enables, for example, collection of the inflation pressure data in the sensing unit 21 or calculations in the control unit 22.

The transceiver 2 configured in this way is attached, for example, to an air-charge valve of each of the wheels 6a-6d and arranged with the sensing unit 21 being exposed to the inside of the tire. Thus, it is so configured that an associated tire inflation pressure is detected to transmit the frame at the every predetermined interval (e.g., every minute) through the transmitting antenna 26 provided at each of the transceivers 2.

As shown in FIG. 2(b), the receiver 3 includes an antenna 31, an RF receiving unit 32 and a control unit 33. Of these, the RF receiving unit 32 and the control unit 33 compose a second processing unit PU2.

The antenna 31, which is fixed to the vehicle body 7, is a single antenna shared between the individual transceivers 2. The antenna 31 receives all the frames transmitted from the individual transceivers 2.

Upon reception of the frames from the individual transceivers 2 by the antenna 31, the RF receiving unit 32 inputs the frames therein and transmits them to the control unit 33. The RF receiving unit 32 functions as an input unit.

The control unit 33 is made up of a known microcomputer having, for example, a CPU, ROM, RAM and I/O and executes predetermined processes according to programs stored in the ROM.

Specifically, the control unit 33 outputs a triggering command signal for commanding output of a triggering signal to the triggering device 5. At the same time, the RF receiving unit 32 receives the frames and performs wheel position detection. The detection is performed by specifying the correlation of each of the transmitted frames with relevant one of the transceivers 2 installed on the four wheels 6a-6d, on the basis of the reception intensity of the triggering signal at the transceiver 2, which is stored in each of the frames.

Further, the control unit 33 performs signal processes and calculations based on the data indicative of the results of detection, which data is stored in each of the received frames. Through these processes and calculations, a tire inflation pressure is obtained. Then, an electrical signal corresponding to the obtained tire inflation pressure is outputted to the display device 4. For example, the control unit 33 compares the obtained tire inflation pressure with a predetermined threshold "Th". When it is detected, through the comparison, that the tire inflation pressure has been reduced, the control unit 33 outputs a signal accordingly to the display device 4. Thus, reduction of the tire inflation pressure of any of the four wheels 6a-6d can be transmitted to the display device 4.

As shown in FIG. 1, the display device 4 is disposed at a position for enabling the driver to visually recognize it. The display device 4 is made up, for example, of a warning lamp which is arranged in an instrumental panel in the vehicle 1. When, for example, a signal indicating reduction of a tire inflation pressure is transmitted from the control unit 33 of the receiver 3, the display device 4 indicates accordingly so as to warn the driver of the reduction of the tire inflation pressure.

Upon input of the triggering command signal transmitted from the control unit 33 of the receiver 3, the triggering device 5 outputs a triggering signal of predetermined signal intensity in LF (low-frequency) band ranging, for example, from 125 to 135 kHz. For example, triggering signals having modes as shown in FIGS. 3A to 3C are usable.

Figure 3A:
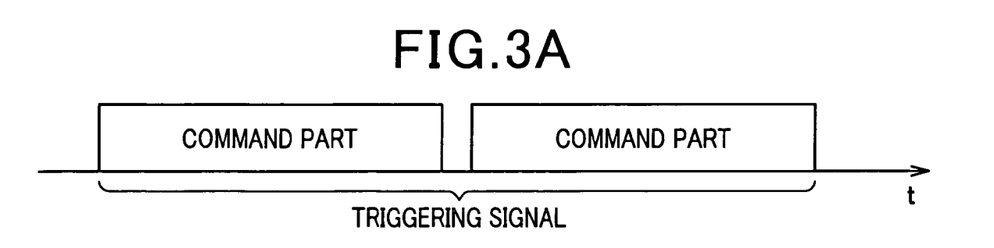
FIGS. 3A to 3C are pattern diagrams illustrating modes of triggering signals.

FIG. 3A shows a mode of a triggering signal, in which a plurality of frames each storing a command part are arranged. Each command part includes a startup command and an execution command. The startup command is fixed, in advance, as a command for switching the control unit 22 of the transceiver 2 from a sleep mode to a wake-up mode. The execution command gives operation instructions. Specifically, the execution command allows the control unit 22 to measure the reception intensity of the received triggering signal. At the same time, the execution command allows, as required, the control unit 22 to process the reception intensity data, store the reception intensity data in the frame that has stored the inflation pressure data, or in a different frame, and then transmit the frame to the RF transmitting unit 23. For example, such a triggering signal may be an electromagnetic wave of 125 kHz. Upon reception of a frame storing a first command part, the transceiver 2 measures the reception intensity of the subsequent frame storing a second command part, to thereby achieve measurement of the reception intensity of the triggering signal. Exemplification here shows a triggering signal in which two frames, each storing a command part, are juxtaposed with each other. However, the number of the frames may be three or more. The interval between the frames may be intermittent as shown in FIG. 3A, or may be continuous.

Figure 3B:
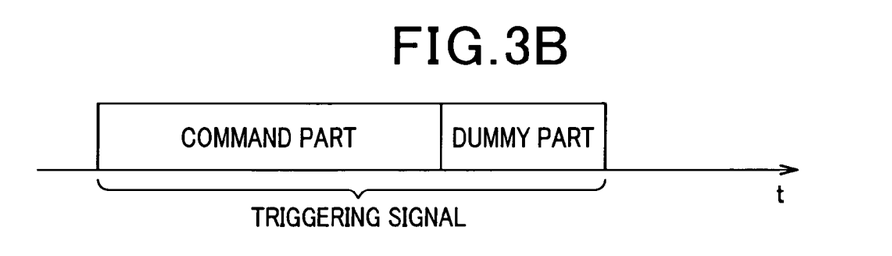

FIG. 3B shows modes of a triggering signal consisting of a frame which stores a command part and a dummy part. Similar to the above mode, the command part includes a startup command and an execution command. The dummy part is used for reception intensity measurement, and thus may be served just, by a modulated or nonmodulated carrier signal. For example, such a triggering signal may be an electromagnetic waveform of 125 kHz. Upon reception of the command part, the transceiver 2 measures the reception intensity of the subsequent dummy part to thereby achieve measurement of the reception intensity of the triggering signal.

Figure 3C:
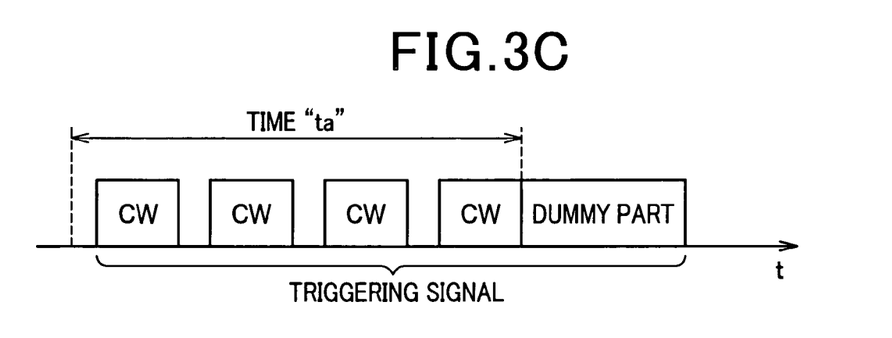

FIG. 3C shows a mode of a triggering signal consisting of a frame which stores a pulse train of signals and a dummy part. The pulse train includes a predetermined number (e.g. four) of pulse signals CW in a fixed period "ta". The pulse train serves as a startup command for switching the transceiver 2 to a wake-up mode. The pulse signals CW may be AM-modulated signals or non modulated signals. Similar to the above mode, the dummy part is used for reception intensity measurement. For example, such a triggering signal may be an electromagnetic wave of 125 kHz. Upon reception of the predetermined number (four) of pulse signals CW within the fixed period "ta", the transceiver 2 measures the reception intensity of the subsequent dummy part to thereby achieve measurement of the reception intensity of the triggering signal.

The modes of the triggering signals shown in the figures are only examples and thus those of other modes may be usable. For example, a frame may be divided for a triggering signal for pre-switching the transceiver 2 to a wake-up mode and a triggering signal for measuring the reception intensity. In this case, there is no need of using the triggering signal for the wake-up mode to perform the reception intensity measurement. Therefore, the reception intensity of this triggering signal may be different from that of the triggering signal for reception intensity measurement. In case the transceiver 2 should be constantly in a wake-up mode, the startup command may be removed from the modes shown in FIGS. 3A and 3B and the remaining portions may be used as triggering signals.

The triggering device 5 is composed of two triggering devices, i.e. a first triggering device 5a disposed on the side of front wheels and a second triggering device 5b disposed on the side of rear wheels.

The triggering devices 5a and 5b are disposed being offset from the center line which symmetrically divides the vehicle 1 left and right, so that distances from each of the triggering devices 5a and 5b to the individual wheels can be differentiated from each other. In the present embodiment, the first triggering device 5a is disposed in the vicinity of the left-front wheel 6b, and the second triggering device 5b is disposed in the vicinity of the left-rear wheel 6d. Thus, both of the devices are disposed on the left side of the center line. Accordingly, the distance from the first triggering machine 5a to the right-front wheel 6a is larger than that from the first triggering machine 5a to the left-front wheel 6b. Also, the distance from the second triggering device 5b to the right-rear wheel 6c is larger than that from the second triggering device 5b to the left-rear wheel 6d.

In the present embodiment, triggering signals transmitted from the first triggering device 5a are adapted to reach the transceivers 2 installed on the left- and right-front wheels 6a and 6b. Also, triggering signals transmitted from the second-triggering device 5b are adapted to reach the transceivers 2 installed on the left- and right-rear wheels 6c and 6d. In this regard, an explanation will be given, referring to a pattern diagram of FIG. 4 including a distance relationship between the first triggering device 5a and the transceivers 2 installed on the right-front wheel 6a and the left-rear wheel 6d.

Figure 4:
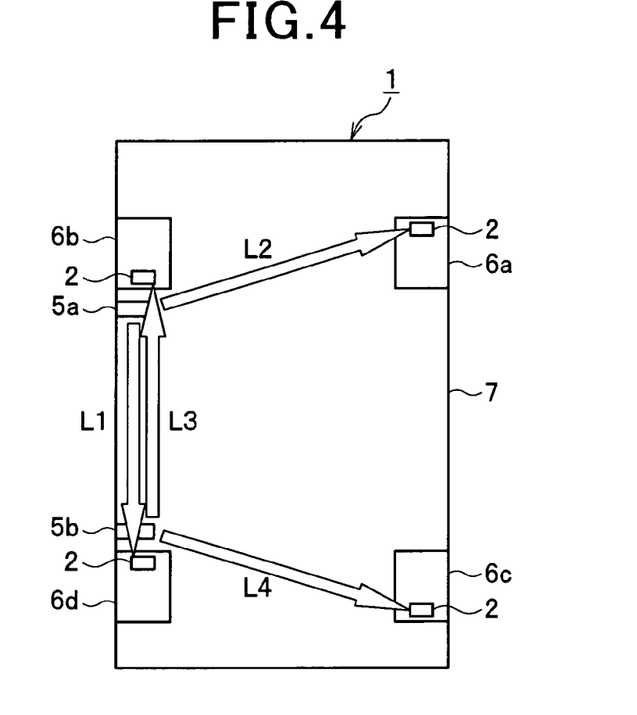
FIG. 4 is a pattern diagram illustrating a distance relationship between a first triggering device and transceivers installed on a right-front wheel and a left-rear wheel.

As shown FIG. 4, indicated by reference L1 is a distance from the first triggering device 5a to the transceiver 2 installed on the left-rear wheel 6d, or a smallest distance from the first triggering device 5a to this transceiver 2 among the distances that change with the rotation of the left-rear wheel 6d. Also, indicated by reference L2 is a distance from the first triggering device 5a to the transceiver 2 installed on the right-front wheel 6a, or a largest distance from the first triggering device 5a to this transceiver 2 among the distances that change with the rotation of the right-front wheel 6a. In this case, in the present embodiment, a ratio of the distance L1 to the distance L2 (L1/L2) is adapted to be 1.2 or more.

Similarly, indicated by reference L3 is a distance from the second triggering device 5b to the transceiver 2 installed on the left-front wheel 6b, or a smallest distance from the first triggering device 5b to this transceiver 2 among the distances that change with the rotation of the left-front wheel 6b. Also, indicated by reference L4 is a distance from the second triggering device 5b to the transceiver 2 installed on the right-rear wheel 6c, or a largest distance from the first triggering device 5b to this transceiver 2 among the distances that change with the rotation of the right-rear wheel 6c. In this case, in the present embodiment, a ratio of the distance L3 to the distance L4 (L3/L4) is adapted to be 1.2 or more.

Figure 5:
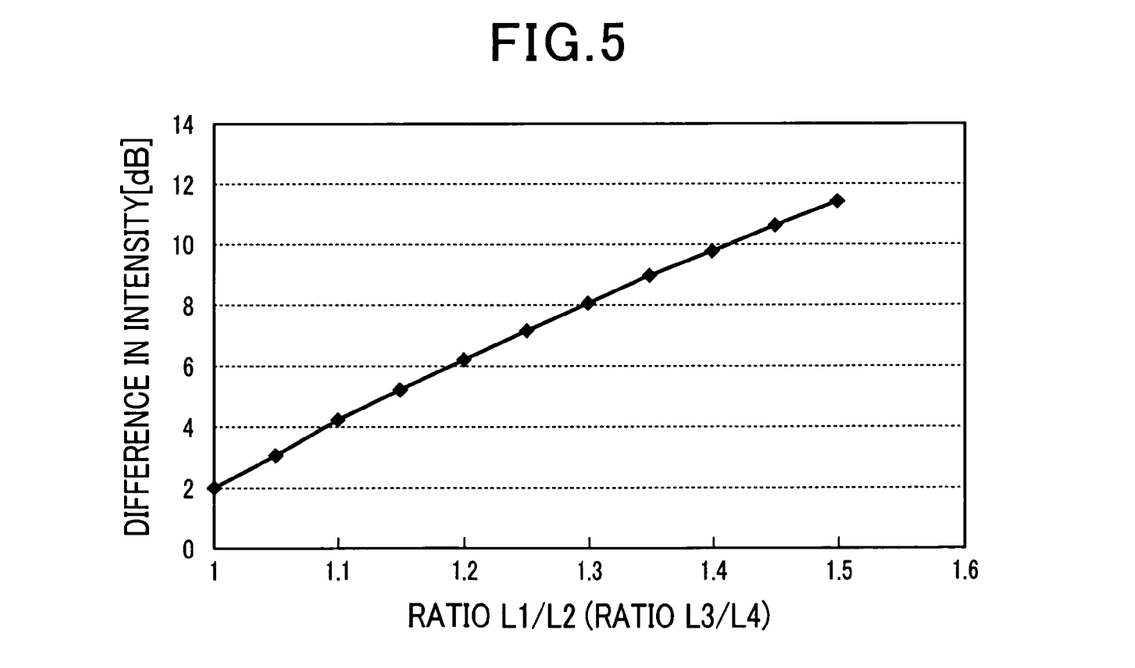
FIG. 5 is a graph illustrating the reception intensity of a triggering signal with respect to the ratio of a distance L1 to a distance L2 (L1/L2)

FIG. 5 is a graph showing differences in the reception intensity of the triggering signals, for the ratio of the distance L1 to the distance L2 (L1/L2). The differences in the reception intensity of the triggering signals shown in the graph have been measured under the circumstances where a triggering signal is most unlikely to be received so by the transceiver 2 installed on the right-front wheel 6a, and most likely to be received by the transceiver 2 installed on the left-rear wheel 6d, being influenced, for example, by the vehicular environment, when the triggering signal is issued from the first triggering 5a.

Assuming that the distances from the first triggering device 5a to the transceivers 2 installed on the right-front wheel 6a and to the left-rear wheel 6d are equal (L1/L2=1), the reception intensities of the triggering signals at the respective transceivers 2 will only reflect the differences based on an influence, for example, of the metal used for the vehicle body. In other words, since there is no difference in the reception intensities of the triggering signals, which difference would be caused by the difference between the distances, the differences that will be caused are based on the influence of an iron plate, for example, used for the vehicle body. The influence, for example, of an iron plate of a vehicle body can be expressed by a value which is unique of the type of the vehicle.

The difference in the reception intensity between the triggering signals becomes larger as the ratio of the distance L1 to the distance L2 (L1/L2) becomes large. In this regard, in order to have the transceiver 2 of the right-front wheel 6a received the triggering signal and in order not to have the transceiver 2 of the left-rear wheel 6d received the triggering signal under the condition where these transceivers 2 receive triggering signals in LF band, the difference in the reception intensity between the triggering signals at these transceivers 2 is required to be 6 dB or more, taking into consideration of variation, for example, in the sensitivities of the transceivers 2. To this end, the ratio of the distance L1 to the distance L2 (L1/L2) may be 1.2 or more as indicated in the present embodiment.

In other words, it is mostly difficult to give irregularities of smaller than ±3 dB to the LF (low-frequency) reception sensitivity of the transceivers, even if irregularities of performances and manufacturing processes are minimized. In the present embodiment, all the transceivers are designed and produced to have the same and highest reception sensitivity. However; even in such a case, it is unavoidable to cause a difference of 6 dB or thereabouts between transceivers with the highest reception performance and the lowest reception performance. Therefore, to make it sure that the triggering signal can be received at, for example, the right-front wheel and cannot be received at, for example, the rear left wheel, it is absolutely necessary to give a difference of 6 dB or more to the strengths of the triggering signals received at those two wheels. This means that the ratio of L1/L2 should be 1.2 or more.

This relationship also applies to the distances L3 and L4. Thus, by ensuring the ratio of the distance L3 to the distance L4 (L3/L4) to be to 1.2 or more, the transceiver 2 installed on the right-rear wheel 6c can be ensured to receive the triggering signal, and the transceiver 2 installed on the left-front wheel 6b can be ensured not to receive the triggering signal, when the triggering signal is outputted from the second triggering device 5b.

The triggering device 5 may be located at any position unless the perimeter thereof is all covered with metal. However, it is preferred that the triggering device 5 is located, as much as possible, at a place which is not covered with metal, or a place, such as in a liner or a vehicle interior, which will not be hit by stones or the like during traveling.

The description has so far been given on a configuration of the tire inflation pressure detecting apparatus in which the wheel position detecting apparatus of the present embodiment is applied.

Hereinafter will be described an operation of the tire inflation pressure detecting apparatus according to the present embodiment. The tire inflation pressure detecting apparatus carries out wheel position detection after the lapse of a predetermined period from when an ignition switch, not shown, is switched from an off-state to an on-state. The wheel position detection is carried out by allowing the control unit 33 of the receiver 3 to execute processes of the wheel position detection.

Figure 6:
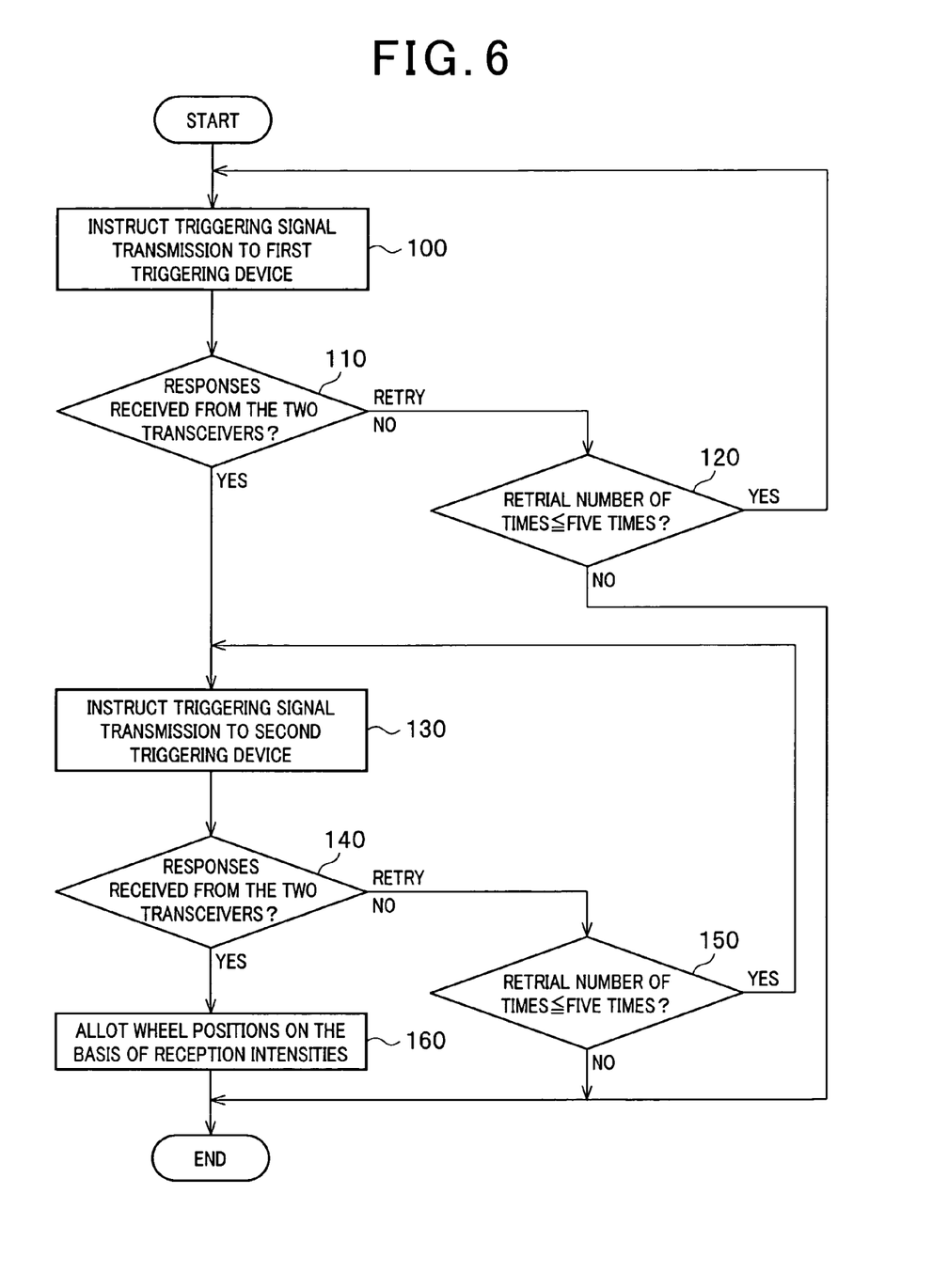
FIG. 6 is a flow diagram illustrating wheel position detection processes executed by a control unit of a receiver.

FIG. 6 is a flow diagram illustrating the wheel position detection processes executed by the control unit 33 of the receiver 3. The wheel position detection processes are executed when the ignition switch, not shown, is switched from an off-state to an on-state and power is supplied to the control unit 33 of the receiver 3.

At step 100, a triggering command signal is outputted to the first triggering device 5a after the lapse of a predetermined period from the turning on of the power. When the triggering command signal is inputted to the first triggering device 5a, triggering signals having a predetermined intensity are outputted to the transceivers 2 installed on the left- and right-front wheels 6a and 6b.

Then, when the triggering signals are inputted to the control unit 22 through the receiving antenna 27 and the triggering signal receiving unit 25 of each of the transceivers 2 installed on the left- and right-front wheels 6a and 6b, each control unit 22 is switched to a wake-up mode. In the wake-up mode, the reception intensity of the received triggering signal is measured in the triggering signal intensity measuring unit 22a.

After the reception intensity of each of the triggering signals has been obtained, the transceiver 2 stores the obtained reception intensity in a frame together with the ID information designated to identify the transceiver 2. The frame is then transmitted to the receiver 3. Since the transmission timing is differentiated between the transceivers 2, the frames transmitted from the transceivers 2 can be reliably received by the receiver 3 without causing radio interference.

Subsequently, at step 110, it is determined whether or not the two transceivers 2 have responded to the triggering signals outputted from the first triggering device 5a. The two transceivers 2 here are the ones installed on the two front wheels 6a and 6b. Specifically, as described above, a ratio of the distance L1 between the first triggering device 5a and the transceiver 2 installed on the left-rear wheel 6d, relative to the distance L2 between the triggering device 5a and the transceiver 2 installed on the right-front wheel 6a (L1/L2) is set at 1.2 or more. Therefore, the triggering signals outputted from the first triggering device 5a are received only by the transceivers 2 installed on the two front wheels 6a and 6b.

However, when the triggering signals are influenced by the ambient environment of the vehicle, such as when the vehicle is parked near a facility or plant emitting jamming radio waves, it is likely that the triggering signals may not be received by the transceivers 2. When at least one of the two transceivers 2 installed on the two front wheels 6a and 6b becomes unable to receive the triggering signal, the two frames may no longer be received. Thus, a determination can no longer be made as to the responses of the two transceivers 2. In this case, a negative determination is made at step 110 and control proceeds to step 120 for retrial of the above processes. At the same time, the count of a counter, not shown, incorporated in the control unit 33 is incremented by "1" to store the number of retrials.

At step 120, it is determined whether or not the number of retrials is five or less. If the number is five or less, control returns to step 100 for retrial. If the number exceeds five, the processes are stopped without making further trial. In this case, it is considered that the transceivers 2 have failed or the battery has exhausted. Such failure or exhaustion may be ensured to be notified through the display device 4.

On the other hand, if a positive determination is made at step 110, control proceeds to step 130. At step 130, a triggering command signal is outputted to the second triggering device 5b. Thus, in the processes of steps 130 to 150, the same processes performed at steps 100 to 120 are executed for the rear wheels 6c and 6d. Since these processes are completely the same as those executed for the front wheels 6a and 6b, explanation is omitted here. By executing these processes, it can be confirmed whether or not the reception intensity data of the triggering signals have been normally transmitted from the transceivers 2 installed on the two rear wheels 6c and 6d.

Subsequently, at step 160, wheel positions are allotted on the basis of the reception intensity data stored in the received respective frames. Specifically, the reception intensity data and pieces of the ID information are read out, at step 110, from the two received frames. The pieces of the ID information are arranged in the order of descending reception intensities. The piece of ID information with higher reception intensity is determined to be of the transceiver 2 installed on the left-front wheel 6b, and the piece of ID information with lower reception intensity is determined to be of the transceiver 2 installed on the right-front wheel 6a. Then, the pieces of the ID information stored in the frames are stored (registered) in a memory of the control unit 33, being correlated to the right-front wheel 6a and the left-front wheel 6b on which these transceivers 2 are installed.

Similarly, at step 140, the reception intensities and pieces of ID information are read out from the received two frames and arranged in the order of descending reception intensities. The piece of ID information with higher reception intensity is determined to be of the transceiver 2 installed on the left-rear wheel 6d, and the piece of ID information with lower reception intensity is determined to be of the transceiver 2 installed on the right-rear wheel 6c. Then, the pieces of the ID information stored in the frames are stored (registered) in the memory of the control unit 33, being correlated to the right-rear wheel 6c and the left-rear wheel 6d on which these transceivers 2 are installed. In this way, the wheel position detection processes are terminated.

In case of performing tire inflation pressure detection, which will be described later, the receiver 3 can first receive a frame that has stored the inflation pressure data, and then determine the transceiver 2 that has transmitted the frame from among the four transceivers 2 installed on the wheels 6a-6d, on the basis of the piece of the ID information stored in the frame. In this way, the inflation pressures of the wheels 6a-6d can be obtained. Thus, it is not necessary for the user to carry out operations, such as reading out the ID information, in order to determine one of the wheels 6a-6d, on which the transceiver 2 in question is installed.

Subsequent to the wheel position detection, the tire inflation pressure detecting apparatus carries out the tire inflation pressure detection.

In particular, the tire inflation pressure detecting apparatus is switched to a regular transmission mode. Then, in each transceiver 2, detection signals indicating an inflation pressure of the tire and a temperature in the tire are inputted from the sensing unit 21 to the control unit 22, as described above. These detection signals are then processed, as required, so as to be used as the inflation pressure data, stored in a frame together with the ID information of the transceiver 2, and transmitted to the side of the receiver 3 through the RF transmitting unit 23 in a periodical manner.

On the other hand, the frame transmitted from the transceiver 2 is received by the antenna 31 of the receiver 3 and inputted to the control unit 33 through the RF receiving unit 32. In the control unit 33, the inflation pressure data and the temperature data of the tire are extracted from the received frame. Then, as required, temperature correction is carried out on the basis of the temperature data to obtain a tire inflation pressure. In this case, the ID information stored in the frame is checked against the ID information that has been stored during the wheel position detection to determine the transceiver 2 in question that has transmitted the frame, from among the four transceivers 2 installed on the respective wheels 6a-6d.

When the change of the inflation pressure of the tire is small, or when a difference between the inflation pressures obtained this time and the previously obtained inflation pressure does not exceed a predetermined threshold, the interval of the inflation pressure detection remains as it is (e.g., every minute). When the change of the inflation pressure is large, or when the difference exceeds the predetermined threshold, the interval is shortened (e.g., every five seconds).

Eventually, when the obtained inflation pressure is determined as being lower than the predetermined threshold, a signal is outputted accordingly to the display device 4 from the control unit 33. In this case, the indication on the display device 4 is made in a manner that can specify the wheel having the tire with the reduced inflation pressure, from among the four wheels 6a-6d. In this way, the driver can be notified which of the wheels 6a-6d has the tire with reduced inflation pressure.

Finally, when the ignition switch is turned from an on-state to an off-state, the control unit 33 of the receiver 3 again outputs a triggering command signal to the triggering device 5, which in turn outputs a triggering signal. When the triggering signal is inputted to the control unit 22 through the receiving antenna 27 and the triggering signal receiving unit 25, the transceiver 2 is switched to a sleep mode. Thus, the inflation pressure detection of the tire inflation pressure detecting apparatus is terminated.

As described above, according to the tire inflation pressure detecting apparatus having the wheel position detecting apparatus of the present embodiment, the ratio of the distance L1 to the distance L2 (L1/L2) is 1.2 or more, and the ratio of the distance L3 to the distance L4 (L3/L4) is 1.2 or more. Thus, the triggering signals outputted from the first triggering device 5a can be adapted to be received only by the transceivers 2 installed on the two front wheels 6a and 6b. Also, the triggering signals outputted from the second triggering device 5b can be adapted to be received only by the transceivers 2 installed on the two rear wheels 6c and 6d.

Thus, the wheel position detecting apparatus can detect the correlation of the four transceivers 2 with the respective four wheels 6a-6d without the need of the user's operation of reading out the ID information. In addition, the wheel position detecting apparatus is capable of preventing the triggering signals from being received by the transceivers 2 which are not subjected to reception of the triggering signals, or which are installed on the wheels not subjected to detection.

Second Embodiment

Hereinafter will be described a second embodiment of the present invention. In the first embodiment, a definition was made as to the distances, which are: the distance L1 from the first triggering device 5a to the transceiver 2 installed on the left-rear wheel 6d; the distance L2 from the first triggering device 5a to the transceiver 2 installed on the right-front wheel 6a; the distance L3 from the second triggering device 5b to the transceiver 2 installed on the left-front wheel 6b; and the distance L4 from the second triggering device 5b to the transceiver 2 installed on the right-rear wheel 6c. In the present embodiment, a description will be provided on a case where the first and second triggering devices 5a and 5b are disposed at optimal positions.

Figure 7:
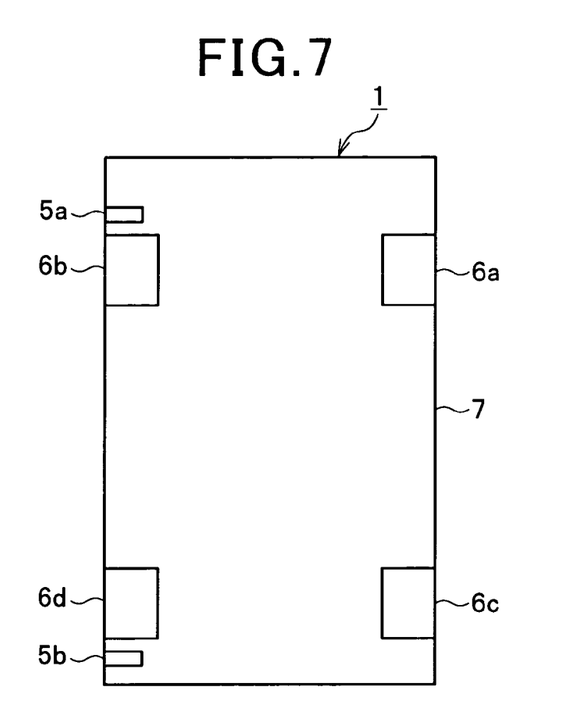
FIG. 7 is a pattern diagram illustrating an arrangement of first and second triggering devices.

FIG. 7 is a pattern diagram illustrating the arrangement of the first and second triggering devices 5a and 5b. As shown in the figure, the first triggering device 5a is disposed more frontward in the vehicle 1 than the two front wheels 6a and 6b. Also, the second triggering device 5b is disposed more rearward in the vehicle 1 than the two rear wheels 6c and 6d. In particular, the first triggering device 5a is disposed frontward of a wheelhouse of the left-front wheel 6b, and the second triggering device 5b is disposed rearward of a wheelhouse of the left-rear wheel 6d.

This arrangement of the first and second triggering devices 5a and 5b can readily make large the ratio of the distance L1 to the distance L2 (L1/L2) and the ratio of the distance L3 to the distance L4 (L3/L4). Thus, the triggering signals outputted from the first triggering device 5a are ensured to be received only by the transceivers 2 installed on the two front wheels 6a and 6b. Also, the triggering signals outputted from the second triggering device 5b are ensured to be received only by the transceivers 2 installed on the two rear wheels 6c and 6d.

Third Embodiment

Hereinafter will be described a third embodiment of the present invention. The third embodiment also further modifies the arrangement of the first and second triggering devices 5a and 5b so as to be different from the first embodiment.

Figure 8:
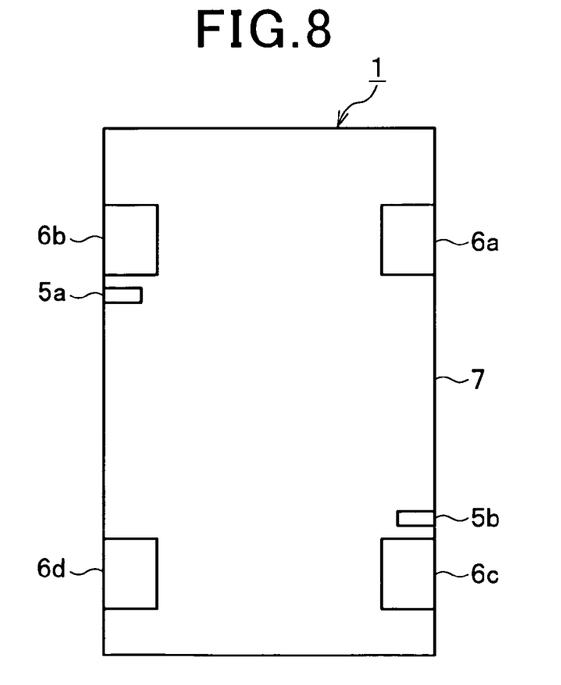
FIG. 8 is a pattern diagram illustrating an arrangement of first and second triggering devices.

FIG. 8 is a pattern diagram illustrating an arrangement of the first and second triggering devices 5a and 5b. As shown in the figure, the first triggering device 5a is offset, as in the first embodiment, from the center line of the vehicle 1 so as to be closer to the left-front wheel 6b than to the right-front wheel 6a. The second triggering device 5b is offset from the center line of the vehicle 1 so as to be closer to the right-rear wheel 6c than to the left-rear wheel 6d. Specifically, the left-front wheel 6b in the two wheels 6a and 6b, to which the first triggering device 5a is arranged closer, and the right-rear wheel 6c in the two wheels 6c and 6d, to which the second triggering device 5b is arranged closer, are adapted to be disposed on a diagonal line.

As described above, the ratio of the distance L1 to the distance L2 (L1/L2), and the ratio of the distance L3 to the distance L4 (L3/L4) are rendered to be 1.2 or more. Thus, the triggering signals outputted from the first triggering device 5a are ensured to be received only by the transceivers 2 installed on the two front wheels 6a and 6b. Also, the triggering signals outputted from the second triggering device 5b are ensured to be received only by the transceivers 2 installed on the two rear wheels 6c and 6d.

Thus, the positional relationship of the first and second triggering devices 5a and 5b can be uniquely established. Accordingly, the arrangement of the present embodiment can achieve the advantages similar to those of the first embodiment.

This mode of arrangement in which the triggering devices 5a and 5b are disposed on both of the left and right sides, respectively, may balance the weight of the triggering devices 5a and 5b and wire harnesses linked thereto, between the left and right of the vehicle 1. Thus, the weight of the vehicle 1 can be well balanced between left and right. In case of the door control based on a smart entry system, the door control is performed by allowing a triggering device provided in the vehicle 1 to output a triggering signal, and allowing a smart key possessed by the user to output a check signal when the smart key has received the triggering signal. In this case, the vehicle 1 is required to be provided with the triggering device on both the left and right sides. In this regard, the first and second triggering devices of the present embodiment, which are disposed left and right of the vehicle 1, can also serve as the triggering devices for outputting triggering signals in the smart entry system. Drawing the wire harnesses from the receiving unit 3 to the triggering device 5 may often be limited due to the convenience (e.g., arrangement of other parts) of the vehicle 1. In this case as well, the first and second triggering devices 5a and 5b can be positioned in conformity with the convenience of the vehicle 1.

Other Embodiments

The embodiments described above have included the antenna 31 that serves as a single antenna shared between the transceivers. Alternative to this, four antennas may be provided for the respective wheels 6a-6d. However, the present embodiment can be effectively applied in the case where the antenna 31 is used as a single antenna shared between the transceivers because, in this case, it becomes particularly difficult to specify the wheels 6a-6d on which the transceivers 2 are installed.

The embodiments described above have been configured to perform the wheel position detection after the lapse of a predetermined period from when the ignition switch has been turned from an off-state to an on-state. Therefore, even when the tires of the vehicle 1 appear to be in normal conditions, it is possible to detect the already caused blowout or the abnormally reduced inflation pressure of the tires before the driver drives the vehicle 1. However, the wheel position detection may be conducted on the occasion other than this. For example, the detection may be conducted after rotating the positions of the tires or after changing the tires. The fact of rotating the positions of the tires or changing the tires can be detected by detecting an inclination of the vehicle body 7. The inclination can be detected, for example, by depressing a switch, not shown, for the wheel position detection, or by setting an inclination sensor at the vehicle body.

The embodiment 1 has indicated a case where the first and second triggering devices 5a and 5b are both disposed on the left side of the vehicle 1. The triggering devices, however may alternatively be disposed on the right side. Further the second embodiment has indicated a case where the first triggering device 5a is disposed on the side of the left-front wheel 6b and the second triggering device 5b is disposed on the side of the right-rear wheel 6c. Alternatively, however, the first triggering device 5a may be disposed on the side of the right-front wheel 6a and the second triggering device 5b may be is disposed on the side of the left-rear wheel 6d.

In the above embodiments, the first triggering device 5a has been disposed on the side of the two front wheels 6a and 6b and the second triggering device 5b has been disposed on the side of the two rear wheels 6c and 6d. Further, in the above embodiments, the left and right front wheels 6a and 6b have been paired to output triggering signals thereto from the first triggering device 5a. Also, the left and right-rear wheels 6c and 6d have been paired to output triggering signals thereto from the second triggering device 5b. Alternatively, the first triggering device 5a may be disposed on the side of the two left wheels 6b and 6d and the second triggering device 5b may be disposed on the side of the two right wheels 6a and 6c. Then, the two left wheels 6b and 6d may be paired to output triggering signals thereto from the first triggering device 5a, and the two right wheels 6a and 6c may be paired to output triggering signals thereto from the second triggering so device 5b. In this case, the first triggering device 5a may be disposed so as to be closer to one of the two left wheels 6b and 6d than to the other. Similarly, the second triggering device 5b may be disposed closer to one of the two right wheels 6a and 6c than to the other. This arrangement can differentiate the reception intensities when the triggering signals are outputted from the first and second triggering devices 5a and 5b, thereby achieving the similar advantages as in the above embodiments.

In each of the above embodiments described above, the embodiment has been applied to a four-wheel vehicle. However, the application is not limited to a four-wheel vehicle. For example, the present invention can also be applied to a wheel position detecting apparatus and a tire inflation pressure detecting apparatus for those vehicles which have four or more wheels, such as heavy vehicles.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. An apparatus for detecting positions of a plurality to wheels of a vehicle, comprising:
    transceivers attached respectively to the plurality of wheels, each of the transceivers comprising a processing unit for receiving a triggering signal, calculating a reception intensity of the triggering signal, and storing data indicative of the reception intensity into a frame to be transmitted, the transceivers transmitting the frame processed by the processing unit;
    a triggering device disposed in a body of the vehicle and formed to output the triggering signal;
    a receiver disposed to the body and formed for receiving the frame transmitted from the transceivers and processing the received frame to read out the data indicative of the reception intensity from the frame and use the readout data to detect the positions of the wheels by determining which transceiver is attached to which wheel,
    wherein the plurality of wheels including two front wheels composed of a right-front wheel and a left-front wheel and two rear wheels composed of a right-rear wheel and a left-rear wheel;
    the triggering device includes a first triggering device located closer to the two front wheels than the two rear wheels and located at a position where distances from the right-front wheel and the left-front wheel are different from each other, and a second triggering device located closer to the two rear wheels than the two front wheels and located at a position where distances from the right-rear wheel and the left-rear wheel are different from each other;
    provided that, i) of the two rear wheels, when the transceiver attached to a specific wheel located closer to the first triggering device approaches most closely to the first triggering device, a distance between the first triggering device and the transceiver attached to the specific wheel located closer to the first triggering device is L1, and, ii) of the two front wheels, when the transceiver attached to a specific wheel which is the farthest from the first triggering device approaches to a position which is the farthest from the first triggering device, and a distance between the first triggering device and the transceiver attached to the specific wheel which is the farthest from the first triggering device is L2, a ratio of L1/L2 is 1.2 or more; and
    provided that, iii) of the two front wheels, when the transceiver attached to a specific wheel located closer to the second triggering device approaches most closely to the second triggering device, a distance between the second triggering device and the transceiver attached to the specific wheel located closer to the second triggering device is L3, and, iv) of the two rear wheels, when the transceiver attached to a specific wheel which is the farthest from the second triggering device approaches to a position which is the farthest from the second triggering device, and a distance between the second triggering device and the transceiver attached to the specific wheel which is the farthest from the second triggering device is L4, a ratio of L3/L4 is 1.2 or more.

2. The apparatus of claim 1, wherein the first triggering device is located anterior to the two front wheels and the second triggering device is located posterior to the two rear wheels.

3. The apparatus of claim 2, wherein the first triggering device is located anterior to a tire housing of a one wheel of the two front wheels which is closer to the first triggering device than the other, and
    the second triggering device is located posterior to a tire housing of a one wheel of the two rear wheels which is closer to the second triggering device than the other.

4. The apparatus of claim 1, wherein a one wheel of the two rear wheels which is closer to the second triggering device than the other and a one wheel of the two front wheels which is closer to the first triggering device than the other are located diagonally to each other on the body of the vehicle.

5. The apparatus of claim 2, wherein a one wheel of the two rear wheels which is closer to the second triggering device than the other and a one wheel of the two front wheels which is closer to the first triggering device than the other are located diagonally to each other on the body of the vehicle.

6. The apparatus of claim 3, wherein a one wheel of the two rear wheels which is closer to the second triggering device than the other and a one wheel of the two front wheels which is closer to the first triggering device than the other are located diagonally to each other on the body of the vehicle.

7. An apparatus for detecting positions of a plurality to wheels of a vehicle, comprising:
    transceivers attached respectively to the plurality of wheels, each of the transceivers comprising a processing unit for receiving a triggering signal, calculating a reception intensity of the triggering signal, and storing data indicative of the reception intensity into a frame to be transmitted, the transceivers transmitting the frame processed by the processing unit;

a triggering device disposed in a body of the vehicle and formed to output the triggering signal;

a receiver disposed to the body and formed for receiving the frame transmitted from the transceivers and processing the received frame to read out the data indicative of the reception intensity from the frame and use the read-out data to detect the positions of the wheels by determining which transceiver is attached to which wheel, wherein the plurality of wheels including two right wheels composed of a right-front wheel and a right-rear wheel and two left wheels composed of a left-front wheel and a left-rear wheel;

the triggering device includes a first triggering device located closer to the two left wheels than the two right wheels and located at a position where distances from the left-front wheel and the left-rear wheel are different from each other, and a second triggering device located closer to the two right wheels than the two left wheels and located at a position where distances from the right-front wheel and the right-rear wheel are different from each other;

provided that, i) of the two right wheels, when the transceiver attached to a specific wheel located closer to the first triggering device approaches most closely to the first triggering device, a distance between the first triggering device and the transceiver attached to the specific wheel located closer to the first triggering device is L1, and, ii) of the two left wheels, when the transceiver attached to a specific wheel which is the farthest from the first triggering device approaches to a position which is the farthest from the first triggering device, and a distance between the first triggering device and the transceiver attached to the specific wheel which is the farthest from the first triggering device is L2, a ratio of L1/L2 is 1.2 or more; and provided that, iii) of the two left wheels, when the transceiver attached to a specific wheel located closer to the second triggering device approaches most closely to the second triggering device, a distance between the second triggering device and the transceiver attached to the specific wheel located closer to the second triggering device is L3, and, iv) of the two right wheels, when the transceiver attached to a specific wheel which is the farthest from the second triggering device approaches to a position which is the farthest from the second triggering device, and a distance between the second triggering device and the transceiver attached to the specific wheel which is the farthest from the second triggering device is L4, a ratio of L3/L4 is 1.2 or more.

8. An apparatus for detecting inflation pressure of tires provided at a plurality of wheels of a vehicle, comprising transceivers attached respectively to the plurality of wheels, each of the transceivers comprising a sensing unit sensing inflation pressure of each tire and outputting a sensing signal indicative of the inflation pressure, a first receiving unit receiving a triggering signal, a first processing unit receiving the triggering signal received by the first receiving unit, calculating a reception intensity of the triggering signal, processing the sensing signal indicative of the inflation pressure, and storing data indicative of the reception intensity and the processed sensing signal into a frame to be transmitted, and a transmitting unit transmitting the frame processed by the first processing unit;

a triggering device disposed in a body of the vehicle and formed to output the triggering signal;

a receiver disposed to the body and formed to comprise a second receiving unit receiving the frame transmitted from the transceivers, a second processing unit receiving the frame received by the second receiving unit and processing the received frame to read out the data indicative of the reception intensity from the frame and use the read-out data to detect the positions of the wheels by determining which transceiver is attached to which wheel, and a calculating unit that calculates the inflation pressure of each tire based on the sensing signal stored in the frame, wherein the plurality of wheels including two front wheels composed of a right-front wheel and a left-front wheel and two rear wheels composed of a right-rear wheel and a left-rear wheel;

the triggering device includes a first triggering device located closer to the two front wheels than the two rear wheels and located at a position where distances from the right-front wheel and the left-front wheel are different from each other, and a second triggering device located closer to the two rear wheels than the two front wheels and located at a position where distances from the right-rear wheel and the left-rear wheel are different from each other;

provided that, i) of the two rear wheels, when the transceiver attached to a specific wheel located closer to the first triggering device approaches most closely to the first triggering device, a distance between the first triggering device and the transceiver attached to the specific wheel located closer to the first triggering device is L1, and, ii) of the two front wheels, when the transceiver attached to a specific wheel which is the farthest from the first triggering device approaches to a position which is the farthest from the first triggering device, and a distance between the first triggering device and the transceiver attached to the specific wheel which is the farthest from the first triggering device is L2, a ratio of L1/L2 is 1.2 or more; and provided that, iii) of the two front wheels, when the transceiver attached to a specific wheel located closer to the second triggering device approaches most closely to the second triggering device, a distance between the second triggering device and the transceiver attached to the specific wheel located closer to the second triggering device is L3, and, iv) of the two rear wheels, when the transceiver attached to a specific wheel which is the farthest from the second triggering device approaches to a position which is the farthest from the second triggering device, and a distance between the second triggering device and the transceiver attached to the specific wheel which is the farthest from the second triggering device is L4, a ratio of L3/L4 is 1.2 or more.

9. The apparatus of claim 8, wherein the first triggering device is located anterior to the two front wheels and the second triggering device is located posterior to the two rear wheels.

10. The apparatus of claim 9, wherein the first triggering device is located anterior to a tire housing of a one wheel of the two front wheels which is closer to the first triggering device than the other, and the second triggering device is located posterior to a tire housing a one wheel of the two rear wheels which is closer to the second triggering device than the other.

11. The apparatus of claim 8, wherein a one wheel of the two rear wheels which is closer to the second triggering device than the other and a one wheel of the two front wheels which is closer to the first triggering device than the other are located diagonally to each other on the body of the vehicle.

* * * * *